United States Patent [19]
Hoerl et al.

[11] Patent Number: 5,528,902
[45] Date of Patent: Jun. 25, 1996

[54] SUPPORT HOUSING FOR EXHAUST GAS TURBOCHARGERS

[75] Inventors: Guenther Hoerl, Immenstaad; Edmund Eberhardt, Meckenbeuren, both of Germany

[73] Assignee: MTU Motoren- Und Turbinen-Union Friedrichshafen GmbH, Friedrichshafen, Germany

[21] Appl. No.: 347,366

[22] PCT Filed: Jun. 1, 1993

[86] PCT No.: PCT/EP93/01374

§ 371 Date: May 2, 1995

§ 102(e) Date: May 2, 1995

[87] PCT Pub. No.: WO/9324735

PCT Pub. Date: Dec. 9, 1993

[30] Foreign Application Priority Data

Jun. 2, 1992 [DE] Germany ............... 42 18 145.3
Jun. 2, 1992 [DE] Germany ............... 42 18 146.1

[51] Int. Cl.⁶ ................................................. F02B 37/00
[52] U.S. Cl. ..................................... 60/612; 417/407
[58] Field of Search ........................... 60/612; 417/407

[56] References Cited

U.S. PATENT DOCUMENTS 2,582,916  1/1952  Taub.
3,673,798  7/1972  Kuehl.
4,344,289  8/1982  Curiel et al. ............... 60/612
4,400,945  8/1983  Deutschmann et al. ...... 60/612

FOREIGN PATENT DOCUMENTS 0014778  9/1980  European Pat. Off..
2363699  3/1978  France.
3005655  8/1981  Germany.

*Primary Examiner*—Michael Koczo
*Attorney, Agent, or Firm*—Evenson, McKeown, Edwards & Lenahan

[57] ABSTRACT

A support housing for the fastening of the exhaust gas turbochargers of an internal-combustion engine is provided. The support housing encloses a hollow space which is used for receiving the turbines of the exhaust gas turbochargers while the compressors are situated outside the hollow space. In order to simplify the manufacturing and assembly and to reduce the costs, bearing housings of the exhaust gas turbochargers are integrated in the support housing. The manufacturing and the assembly may also be simplified and rendered less expensive by the fact that the support housing is divided into two symmetrical housing parts along a plane extending through the perpendicular axis in the center of the support housing. In this case, the two housing parts are preferably constructed to be centrically symmetrical with respect to the central perpendicular axis.

7 Claims, 3 Drawing Sheets

SUPPORT HOUSING FOR EXHAUST GAS TURBOCHARGERS

BACKGROUND AND SUMMARY OF THE INVENTION

The invention relates to a support housing for exhaust gas turbochargers which can be placed on an internal-combustion engine and, more particularly, to a support housing for at least two exhaust gas turbochargers which can be placed on an internal-combustion engine. The exhaust gas turbochargers are each constructed with two blade wheels arranged on a common shaft. One blade wheel is arranged in a compressor housing and the other is arranged in a turbine housing. The common shaft is in each case disposed in a bearing housing arranged between the compressor housing and the turbine housing. The turbine housings of the exhaust gas turbochargers form flow spaces which each comprise a spiral duct, an adjoining, radially interior blade wheel duct and an axially directed outlet duct. The support housing is constructed as a box-type supporting device for the exhaust gas turbochargers which contains a hollow space and on which the exhaust gas turbochargers are fastened. The compressor housings are arranged outside the hollow space and the turbine housings are arranged inside the hollow space. Recesses for passing-through the shafts of the exhaust gas turbochargers are provided in the walls of the support housing as well as openings for feeding and removing the exhaust gases to and from the turbine housings.

A support housing of the above described type is known from German Patent document DE 34 39 738 C2. In the case of this known supercharged internal-combustion engine, the turbine housing of the exhaust gas turbocharger is arranged in a hollow space formed by a support housing. The compressor housing of the exhaust gas turbocharger is disposed outside the hollow space. For the purpose of fastening, the exhaust gas turbocharger is received, together with its bearing housing, in a cylindrical recess of the lateral wall of the support housing. The exhaust gas turbocharger is fastened on the support housing by using screws. This cylindrical recess for receiving the bearing housing is formed by two semicircular recesses having an upper and a lower part on the edges. On the edges of the upper and lower part, the support housing is composed. When the upper part is taken off, the exhaust gas turbocharger can be inserted in the recess at the lower part for assembly purposes. The assembly can be completed when the upper part is fitted back on.

The bearing housing of an exhaust gas turbocharger according to German Patent document DE 35 32 695 C1, is at the same time, constructed as an engine support arranged between an elastic bearing and the internal-combustion engine. In this dual function as a bearing housing and as an engine support, a savings in components is achieved which has corresponding advantages. However, it is not always possible or desirable to arrange an exhaust gas turbocharger in an area of the internal-combustion engine in which the bearing housing is used as an engine support.

In the case of a supercharged internal-combustion engine according to German Patent document DE 30 05 655 C2, a support housing placed on the internal-combustion engine, which is composed of a lower part and an upper part, is also used for the space-saving fastening of exhaust gas turbochargers. In this case, the turbine housings of the exhaust gas turbochargers and the corresponding exhaust gas pipes are arranged inside a hollow space formed by the support housing. The compressor housings with the corresponding charge air pipes are situated outside the hollow space. The exhaust gas turbochargers, which are arranged with horizontal axes, are disposed in the area of the bearing housings in semi-cylindrical recesses of the edge areas of the upper and the lower part. The upper and lower parts rest against one another in a horizontal dividing joint. When the upper part is removed, an exhaust gas turbocharger can be inserted for assembly purposes in the recess on the bottom part and, after the upper part is fitted back on, can be fastened by means of screws on the upper and the lower part.

In the case of the example in German Patent document DE 30 05 655 C2, wherein a charger arrangement consists of two groups for two-stage charging, the support housing encloses four turbine housings which are arranged with respect to a perpendicular axis of the support housing in a centrically symmetrical manner in a support housing. The support housing is also constructed in a centrically symmetrical manner. It is considered a disadvantage of the known support housing construction that it consists of differently constructed components which are expensive to manufacture because correspondingly different tools must be made available for the manufacturing. For the case of a conventional cast construction different form tools are required. These different tools are expensive.

There is therefore needed a simplified manufacturing and mounting for a support housing, while achieving a space-saving construction which thus makes it less expensive.

These needs are achieved according to the present invention by providing a support housing for at least two exhaust gas turbochargers which can be placed on an internal-combustion engine. The exhaust gas turbochargers are each constructed with two blade wheels arranged on a common shaft. One blade wheel is arranged in a compressor housing and the other is arranged in a turbine housing. The common shaft is in each case disposed in a bearing housing arranged between the compressor housing and the turbine housing. The turbine housings of the exhaust gas turbochargers form flow spaces which each comprise a spiral duct, an adjoining, radially interior blade wheel duct and an axially directed outlet duct. The support housing is constructed as a box-type supporting device for the exhaust gas turbochargers which contains a hollow space and on which the exhaust gas turbochargers are fastened. The compressor housings are arranged outside the hollow space and the turbine housings are arranged inside the hollow space. Recesses for passing-through the shafts of the exhaust gas turbochargers are provided in the walls of the support housing as well as openings for feeding and removing the exhaust gases to and from the turbine housings. The bearing housings of the exhaust gas turbochargers are integrated into the walls of the support housing.

In this manner, the support housing is therefore constructed such that, not only can the exhaust gas turbochargers be fastened on it and the exhaust gas turbine housings be arranged in a hollow space, but also that it contains the bearing housing in which the shafts of the exhaust gas turbochargers are disposed. It also contains the ducts required for the lubrication of the bearings and is used as a protective housing for the bearing components. The bearing housings are therefore no longer separate components so that the number of required components is reduced whereby the manufacturing and assembly is naturally simplified.

It is particularly advantageous for the support housing to be developed as a cast construction with molded-in bearing housings. In order for the support housing to be accessible from the interior side, it is composed of at least two parts. In this case, it is advantageous not to place the dividing joint in areas in which an exhaust gas turbocharger is to be fastened. This is done so that none of the bearing housings of the exhaust gas turbochargers are divided. This construction is favorable for the assembly. In this case, it is advantageous for the support housing to be divided in a plane in parallel to a perpendicular axis. The exhaust gas turbochargers can then be fully mounted on the housing parts before the housing parts are assembled to form the support housing. It is further advantageous for a symmetrical support housing that the number of components be limited further, and the manufacturing be made still less expensive. This is because both housing parts, i.e., two symmetrical parts, for a support housing may, in each case, be produced using the same tool. The housing parts rest against one another in a dividing joint which is situated in a plane extending in the central perpendicular axis of the support housing. When such symmetrical housing parts are used, the tool costs are reduced because fewer different tools are required. At the same time, the mounting and storage is simplified as a result of the same components being used for both housing parts.

The support housing can be constructed in a particularly space-saving manner when the housing parts consist of two housing parts which are centrically symmetrical with respect to the perpendicular axis and on which the exhaust gas turbochargers are also arranged in a centrically symmetrical manner.

Two groups of two-stage exhaust gas turbochargers can be arranged in a space-saving manner while the mounting is simple if one high-pressure and one low-pressure exhaust gas turbocharger is assigned to each housing part of the support housing. The longitudinal axes of these turbochargers are situated at an acute angle with respect to one another when viewed in the direction of the perpendicular axis.

Other objects, advantages and novel features of the present invention will become apparent from the following detailed description of the invention when considered in conjunction with the accompanying drawings.

DETAILED DESCRIPTION OF THE DRAWINGS

Figure 1:
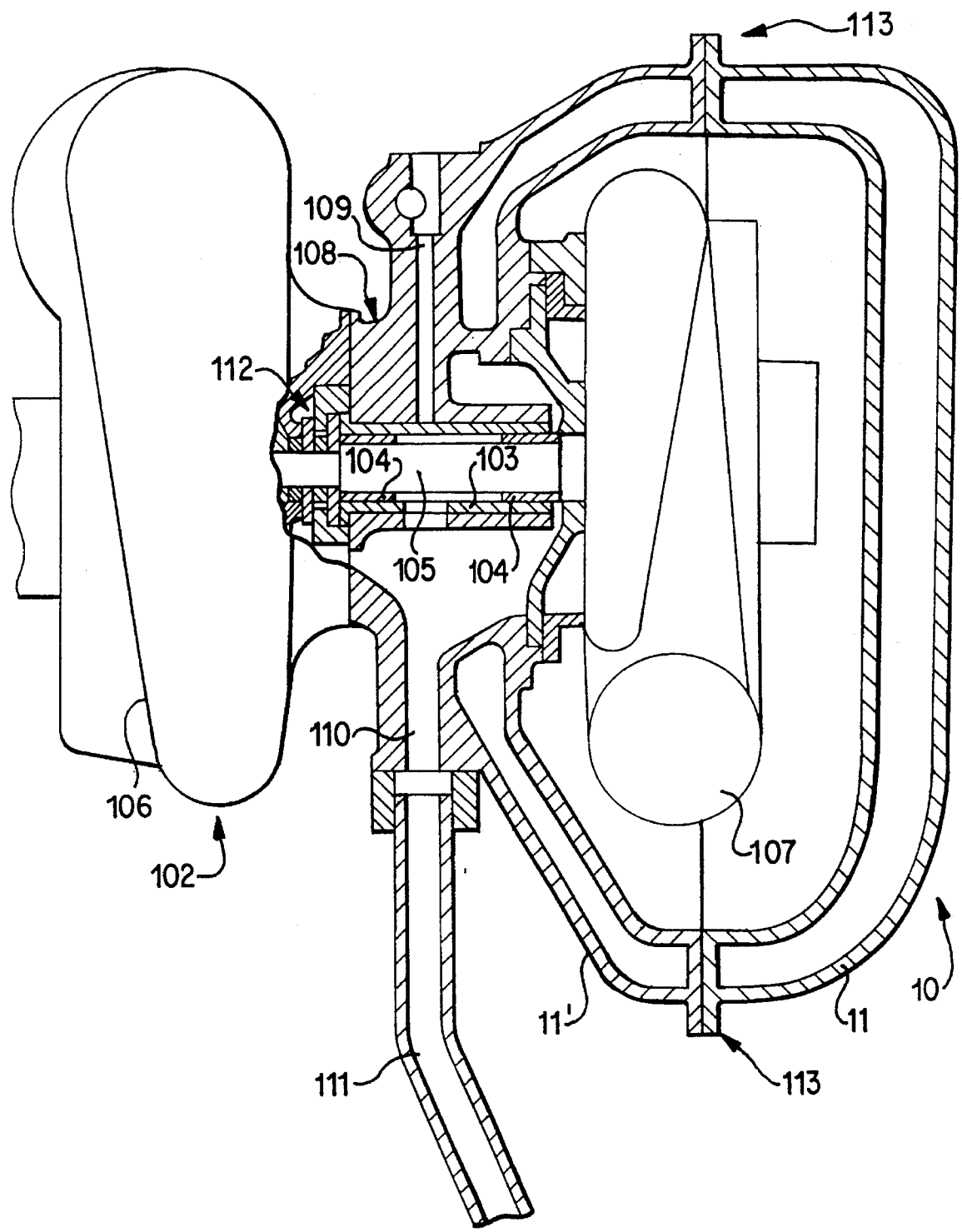
FIG. 1 is a cross-sectional view of a support housing according to the invention with a mounted exhaust gas turbocharger including a bearing housing integrated in the support housing.

The support housing 10 illustrated in the sectional view of FIG. 1 is developed as a cast construction. The support housing consists essentially of two housing parts 11, 11'. The housing parts 11, 11' are connected with one another on flanges 113 using screws. The support housing 10, which is placed on an internal-combustion engine (not shown), forms a hollow space in which the housing of a turbine 107 of an exhaust gas turbocharger 102 is arranged. A compressor 106 of an exhaust gas turbocharger 102 is situated outside the hollow space formed by the support housing 10. The support housing 10 is constructed using a double wall in which cooling water circulates. For passing-through exhaust gas pipes, which are connected with the inlet and the outlet of the turbine 107, the support housing 10 is provided with corresponding passages.

A bearing housing 108 of the exhaust gas turbocharger 102 is molded into a wall of the support housing 10. For receiving a bearing support ring 103, a cylindrical receiving opening is molded into the support housing 10. In the bearing support ring 103, slide bearing bushings 104 of the shaft 105 are arranged. The slide bearing bushings 104 are connected with the blade wheels of the compressor and of the turbine. An axial bearing 112 is used for receiving axial forces. The compressor 106 and the turbine 107 are fastened to the support housing 10 using screws. Furthermore, the support housing 10 contains an inlet duct 109 and an outlet duct 110 for lubricating oil which is used to lubricate the bearings. The outlet duct 110 is connected with a pipe 111 which returns the lubricating oil into a collector pot of the internal-combustion engine. The bearings of the exhaust gas turbocharger 102 are cooled by the appropriate construction of the hollow cooling spaces in the support housing 10.

Figure 2:
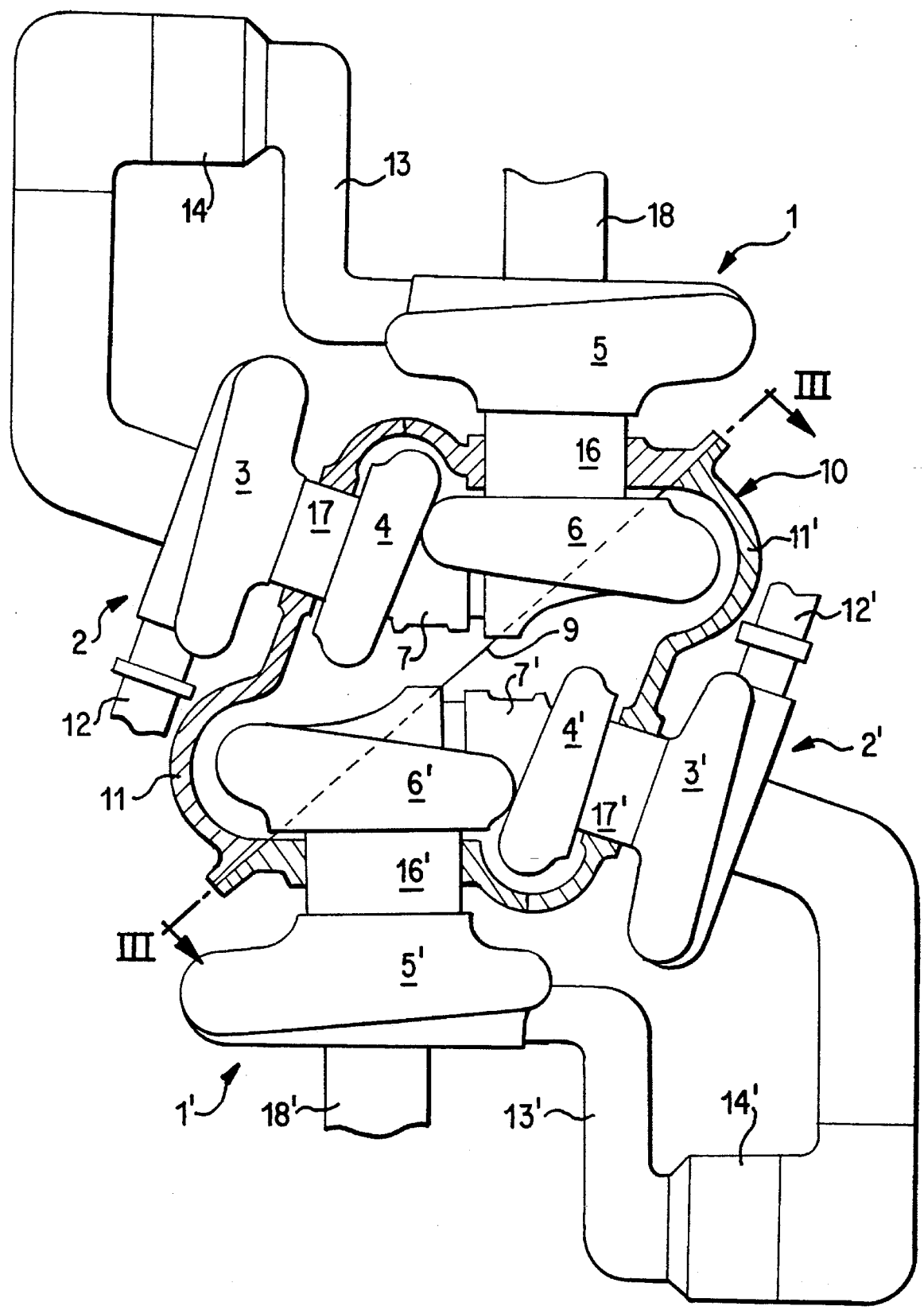
FIG. 2 is a top view of two groups of exhaust gas turbochargers arranged in a support housing for two-stage charging, while the support housing is cut along the sectional lines II—II illustrated in FIG. 3 below at the level of the passages for receiving the charger.

Naturally, the support housing 10 may also be used for the fastening of several exhaust gas turbochargers 1, 2, 1', 2', as illustrated in FIG. 2. The construction of the support housing 10 with the integrated bearing housings 108 permits a simple assembly. Costs are saved in the manufacturing and storage of this construction because of the reduced number of components used. It is particularly advantageous to construct the support housing from symmetrical housing parts with several symmetrically arranged exhaust gas turbochargers, as described in the following with respect to FIGS. 2 and 3.

The turbocharger arrangement illustrated in FIG. 2 in a top view consists of two groups of exhaust gas turbochargers 1, 2 and 1', 2' for providing a two-stage charging. The two groups are arranged centrically symmetrically with respect to one another and with respect to a central perpendicular axis. The high-pressure turbines 4, 4' and the low-pressure turbines 6, 6' of the exhaust gas turbochargers are arranged inside the support housing 10. The support housing 10 is formed of two housing parts 11, 11' which rest against one another along a dividing joint 9. The dividing joint 9 extends in a plane which is situated in the central perpendicular axis of the support housing 10. The housing parts 11, 11' have a centrically symmetrical construction with respect to the central perpendicular axis of the support housing 10. In the area of their bearing housings 16, 17, 16', 17', the exhaust gas turbochargers 1, 2, 1', 2' are inserted in passages of the support housings 10 and are screwed to the passages on steps. The support housing is illustrated in various sectional planes so that the passages which are situated at different levels are visible. By way of passages formed in the bottom of the support housing 10, the engine exhaust gases arrive at the high-pressure turbines 4 and 4'. By way of the outlet connections 7, 7', the exhaust gases will then reach the spiral housings of the low-pressure turbines 6, 6'. By way of the intake connections 18, 18', the charge air is sucked into the low-pressure compressors 5, 5' and is then, by way of the charge air pipes 13, 13' and the charge air coolers 14, 14', guided to the inlet connections of the high-pressure compressors 3, 3'. By way of pipes 12, 12' and other charge air coolers (not shown), the compressed charge air reaches the combustion spaces of the internal-combustion engine.

Figure 3:
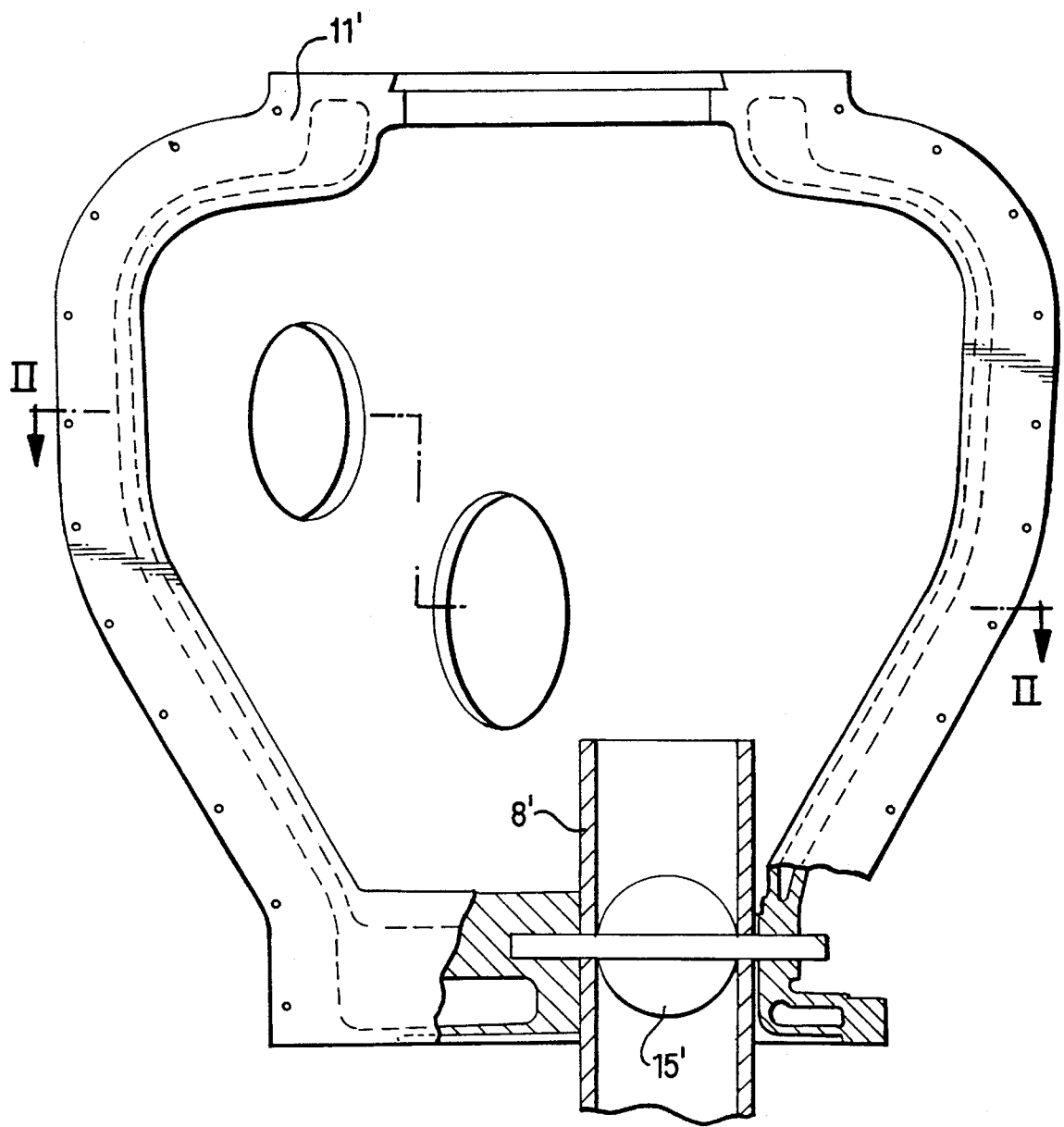
FIG. 3 is a view in the direction of the sectional line III—III illustrated in FIG. 2 extending through the dividing plane of one half of the support housing without the exhaust gas turbocharger.

FIG. 3 is a view of the housing part 11' of the support housing 10 viewed in the direction of the sectional line III—III of FIG. 2. The sectional line III—III is situated along the dividing joint 9. The exhaust gas turbochargers are not shown. In the lateral wall, the passages are shown for receiving the bearing housings of the exhaust gas turbochargers. However, the passages are not shown with the bearing housing integrated in the support housing. In the bottom, a passage is situated which is shown in an offset sectional plane and into which a pipe 8' is inserted. The pipe 8' is connected with the inlet connection of the high-pressure turbine 4'. On the top side of the support housing, a passage is provided for an exhaust gas pipe for the removal of the exhaust gas flow leaving the exhaust gas turbines. According to the operating condition of the internal-combustion engine, the entering exhaust gas can be blocked by way of the flap 15'.

The housing parts 11' and 11 of the support housing 10 are screwed to one another on a surrounding flange by way of screws. The support housing 10 has hollow spaces in which the cooling water of the internal-combustion engine circulates. However, these hollow spaces are not shown in FIG. 2. It is considered to be an advantage of the perpendicular division of the support housing that the support housing can be joined together from two symmetrical housing parts. The symmetry of the components has the advantage of reducing manufacturing costs and a simplifying assembly.

Another reduction of components takes place when, as described in connection with FIG. 1, the bearing housings 16, 17, 16', 17' of the exhaust gas turbochargers in FIG. 2 are integrated in the support housing 10.

In order to ensure that the bearing housings in the support housing are not divided, the support housing preferably is to be divided into two housing halves in such a manner that the dividing joint extends outside the areas in which the bearing housings are arranged.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Support housing for at least two exhaust gas turbochargers arrangeable on an internal-combustion engine, the exhaust gas turbochargers each having two blade wheels arranged on a common shaft, one of said two blade wheels being arranged in a compressor housing and the other of said two blade wheels being arranged in a turbine housing, comprising:

a bearing housing arranged between the compressor housing and the turbine housing having the common shaft disposed therein for each exhaust gas turbocharger;

wherein the turbine housings of the exhaust gas turbochargers form flow spaces, each of said flow spaces including a spiral duct, an adjoining, radially interior blade wheel duct, and an axially directed outlet duct;

wherein the support housing is constructed as a box-type supporting device forming a hollow space therein, said exhaust gas turbochargers being fastened on said box-type supporting device such that the compressor housings are arranged outside the hollow space and the turbine housings are arranged inside the hollow space;

recesses for in walls of the support housing, said common shafts of the exhaust gas turbochargers extending through said recesses;

openings provided in said walls for feeding and removing exhaust gases to and from the turbine housings;

wherein the bearing housings of the exhaust gas turbochargers are formed integrally in one-piece with said walls of the support housing.

2. Support housing according to claim 1, wherein the support housing comprises at least two housing parts, a dividing joint extending between said housing parts being located so as not to extend through said recesses in said walls for receiving the exhaust gas turbochargers.

3. Support housing according to claim 2, wherein the support housing is divided in planes extending in parallel to an axis extending in a direction of a common surface normal line from planes defined by longitudinal axes of said exhaust gas turbochargers, and wherein the exhaust gas turbochargers are fastened to lateral walls of said box-type supporting device.

4. Support housing according to claim 1, wherein the support housing is divided into two substantially symmetrical housing parts along a plane extending through an axis extending in a direction of a common surface normal line from planes defined by longitudinal axes of said exhaust gas turbochargers.

5. Support housing according claim 1, wherein the support housing is formed of two housing parts centrically symmetrical with respect to an axis extending in a direction of a common surface normal line from planes defined by longitudinal axes of said exhaust gas turbochargers, the exhaust gas turbochargers being arranged on said centrically symmetrical housing parts in a centrically symmetrical manner with respect to the central perpendicular axis.

6. Support housing according to claim 2, wherein exhaust gas turbochargers for a two-stage charging are assigned to each of the housing parts respectively, and wherein in the direction of an axis extending in a direction of a common surface normal line from planes defined by longitudinal axes of said exhaust gas turbochargers, horizontally extending longitudinal axed of the exhaust gas turbochargers are each disposed at an acute angle with respect to one another.

7. A support for exhaust gas turbochargers which is arranged on an internal-combustion engine, the exhaust gas turbochargers each having two blade wheels arranged on a common shaft, one of said two blade wheels being arranged in a compressor housing and the other of said two blade wheels being arranged in a turbine housing, comprising:

a support housing constructed as a box-type supporting device forming a hollow space therein, said exhaust gas turbochargers being fastened on said box-type supporting device such that the compressor housings are arranged outside said hollows space and the turbine housings are arranged inside said hollow space; and wherein said box-type supporting device has a bearing housing portion formed integrally therewith for supporting the common shaft of each of said exhaust gas turbochargers.

* * * * *